United States Patent [19]

Lin

[11] Patent Number: 4,926,580

[45] Date of Patent: May 22, 1990

[54] SAFETY SINKER

[76] Inventor: Chen-Ju Lin, No. 13, Lane 194, Chung Hiuao Road, Taichung, Taiwan

[21] Appl. No.: 415,937

[22] Filed: Oct. 3, 1989

[51] Int. Cl.$^5$ .............................................. A01K 75/06
[52] U.S. Cl. .................................... 43/44.89; 43/43.12
[58] Field of Search ................. 43/44.89, 44.90, 44.91, 43/43.12, 42.22

[56] References Cited

U.S. PATENT DOCUMENTS

| | | | |
|---|---|---|---|
| 1,564,147 | 12/1925 | Stickley et al. | 43/43.12 |
| 3,195,262 | 7/1965 | Metzler | 43/43.12 |
| 3,415,005 | 12/1968 | Gilham | 43/43.12 |

Primary Examiner—M. Jordan
Attorney, Agent, or Firm—Varndell Legal Group

[57] ABSTRACT

A safety sinker includes a sinker connected to a fish line through a sinker coupler, wherein the sinker coupler may be pulled, by means of a fish line, to disconnect the sinker from the fish line when the sinker is squeezed in between rocks or somethings during fishing. The sinker coupler includes a fork end having two semi-sphere members made thereon for connecting the sinker when they are squeezed to form into a spherical configuration and inserted into the inner chamber of the sinker. The two semi-sphere members may be squeezed to form into a spherical configuration again, by means of a pull force through the fish line, so as to slip away from the sinker and to disconnect the fish line from the sinker.

1 Claim, 1 Drawing Sheet

SAFETY SINKER

BACKGROUND OF THE INVENTION

The present invention is related to a kind of safety sinker and more particularly to the one which will be rapidly disconnected from a fish line when it is retained by something in the water during fishing.

Fishing was an activity to catch fish for a living in ancient times. It has become an activity not only for living but also for sport. It is also a good way to help one get rid of the mundane affairs. However, one may feel disappointed if one's fishing tackle is damaged during fishing. It is commonly happened that a sinker is squeezed in between somethings in the water during fishing. When one is encountering this problem the only way one can do is to cut off the fish line. When a fish line is cut off, the connected sinker, fishing hook and float etc., must be given up at the same time to cause big loss to the user. If no any spares available, one shall have to stop enjoying fishing.

It is therefore, the main object of the present invention to provide such a safety sinker which will be automatically disconnected from a fish line when it is squeezed in between somethings in the water during fishing so as to permit collection of fish line.

Another object of the present invention is to provide such a safety sinker which can be efficiently connected to a fish line.

BRIEF DESCRIPTION OF THE DRAWINGS

The present invention will become apparent from the following detailed description of this invention referring to the annexed drawings in which.

DETAILED DESCRIPTION OF THE PREFERRED EMBODIMENT

Figure 2:
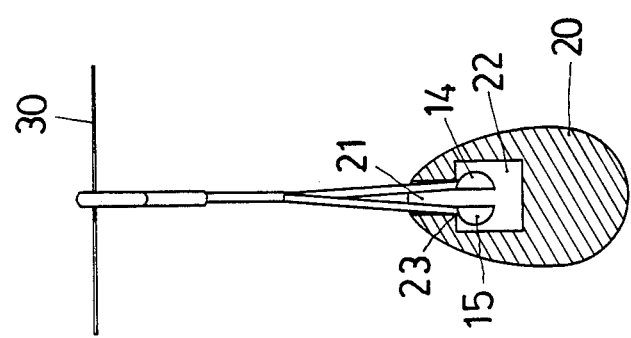
FIG. 2 is a sectional view of the present invention, illustrating the connection of a sinker to a fish line through a sinker coupler.
Figure 1:
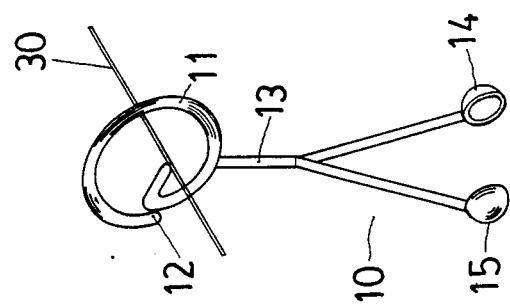
FIG. 1 is a perspective view of a safety sinker embodying the present invention.

Turning now to the annexed drawings in detail, therein illustrated is a safety sinker embodying the present invention. The safety sinker coupler (10) is unitarily made of resilient plastic material through shape molding process and generally comprised of a retaining ring portion (11) at the top for insertion therein through the gap (12), a neck portion (13) extending downward from the retaining ring portion (11), and two opposite semi-sphere members (14) and (15) made on the two terminals of the fork end portion extending from the neck portion (13). The two semi-sphere members (14) and (15) of the sinker coupler (10) may be incorporated to form a sphere for insertion into a sinker. According to the present invention, the sinker (20) includes an opening (21) communicating with its inner chamber (22). The opening (21) is properly made in size just suitable for passing therethrough of the two semi-sphere members (14) and (15) when the two semi-sphere members (14) and (15) are connected into a spherical configuration. As soon as the two semi-sphere members (14) and (15) are connected into a spherical configuration and inserted into the inner chamber (22) of the sinker (20) through the opening (21), the two semi-sphere members (14) and (15) will automatically jump apart at the corner (23) through the effect of elastic resilience, to firmly connect the sinker (20) to the fish line (30) (as shown in FIG. 2).

If the sinker (20) is squeezed in between rocks or something else during fishing, the pull force applied on the fish line (30) will drive the two semi-sphere members (14) and (15) to close into a spherical configuration so as to slip away from the constraint of the inner chamber (22) of the sinker (20) through the opening (21). Thus, the fish line (30) and the sinker coupler (10) can be smoothly received back for further application after a new sinker is attached to the sinker coupler (10). Therefore, the present invention can help to minimize the loss in case the sinker is squeezed in between rocks in water during fishing.

I claim:

1. A safety sinker, including
   a sinker coupler unitarily made of resilient plastic material through shape molding process and generally comprised of a retaining ring portion having a gap made thereon for insertion therethrough of a fish line into the inner space thereof, a neck portion extending downward from said retaining ring portion, a fork end portion extending from said neck portion, and two opposite semi-sphere members made on the two terminals of said fork end portion, a sinker comprising an opening, and an inner chamber communicating with said opening;
   characterized in that said two semi-sphere members of said sinker coupler are spaced away from each other, after having been incorporated into a spherical configuration and inserted into said inner chamber of said sinker through said opening, to firmly connect said sinker to a fish line, and said two semi-sphere members may be squeezed to close together to form into a spherical configuration so as to disconnect from said sinker when a pull force is applied thereto.

* * * * *